G. H. HEWITT, Jr.
AUTOMOBILE NUMBER CARRIER AND DROP.
APPLICATION FILED DEC. 20, 1909.
1,061,910.
Patented May 13, 1913.
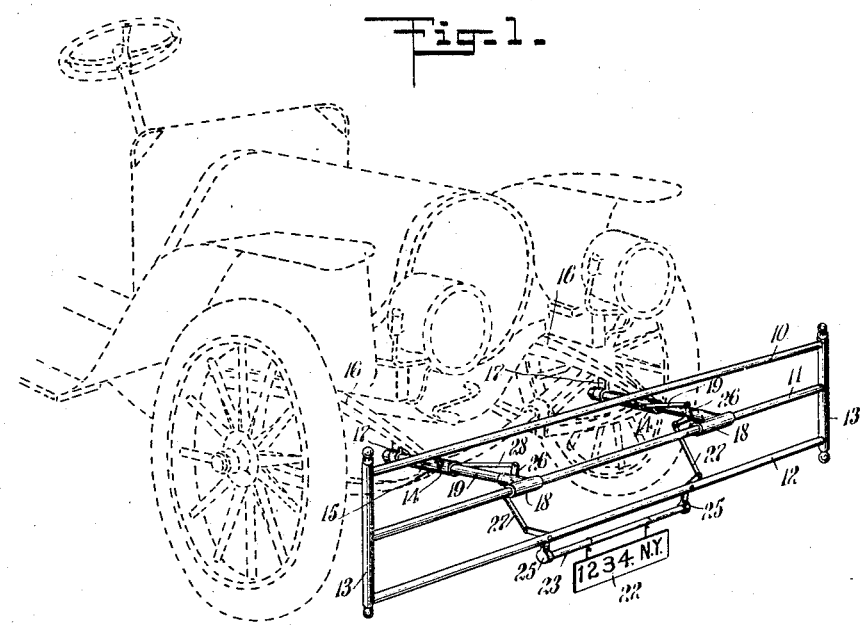
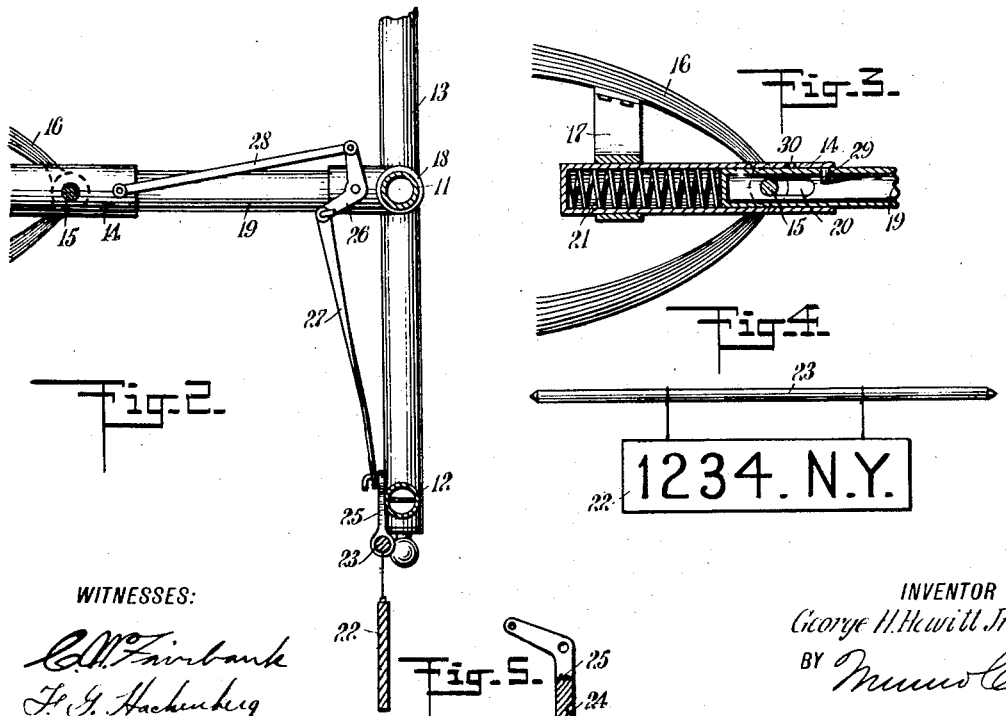
WITNESSES:
INVENTOR
George H. Hewitt Jr.
BY
ATTORNEYS

UNITED STATES PATENT OFFICE.

GEORGE H. HEWITT, JR., OF JERSEY CITY, NEW JERSEY.

AUTOMOBILE NUMBER CARRIER AND DROP.

1,061,910.   Specification of Letters Patent.   Patented May 13, 1913.

Application filed December 20, 1909. Serial No. 534,094.

*To all whom it may concern:*

Be it known that I, GEORGE H. HEWITT, Jr., a citizen of the United States, and a resident of Jersey City, in the county of Hudson and State of New Jersey, have invented a new and Improved Automobile Number Carrier and Drop, of which the following is a full, clear, and exact description.

One of the various objects for providing automobiles and other motor vehicles with license numbers, is to facilitate the identification of the vehicle in case the latter is involved in an accident or collision; but during the confusion following a collision or accident, it often happens that the injured party or the bystanders neglect to note the license number of the car, or fail to remember it accurately.

The object of my invention is to so support the license number that in case of any collision or accident, the tag bearing the number will be automatically released from the car and dropped to the ground, so that the injured party or the bystanders may pick up this tag and use it as a means for ascertaining the identity of the car which was involved in the collision or accident. In case the chauffeur or occupants of the car at fault do not wish to leave the number behind, it is necessary that the car be brought to a stop and one of the occupants thereof must get out and pick up the tag. This involves a sufficient delay to permit of the arrest or detention of the occupants of the car, should such be the course thought advisable.

My improved construction in its preferred form embodies a support or carrier for the tag, and a bumper, fender or trip section, by the movement of which the tag may be released from its carrier. This bumper, fender, or trip is so constructed and so mounted that it will be operated should the car collide with a person or with any object of material size.

The invention consists in the combination and arrangement of parts hereinafter particularly defined in the claims, and one embodiment of which is hereinafter described in detail.

Reference is to be had to the accompanying drawings, forming a part of this specification, in which similar characters of reference indicate corresponding parts in all the figures, and in which—

Figure 1 is a perspective view of a portion of an automobile provided with a device embodying my invention; Fig. 2 is a vertical section through the device, taken in a plane longitudinally of the car; Fig. 3 is a longitudinal section through a portion of the device, showing one means for attaching the same to a car; Fig. 4 is a front elevation of the number tag and the supporting rod which carries the same, and Fig. 5 is a detail showing the movable socket or receiver for the rod shown in Fig. 4.

My improved device embodies as essential features thereof, a bumper, fender or trip, which is adapted to be moved when the car collides with a person or object in front of the car, and means whereby the resulting movement of the bumper, fender or trip releases the number tag and permits it to drop.

In the specific form illustrated in the accompanying drawings, I form the bumper or fender of a plurality of transverse rods 10, 11 and 12, each of a length slightly greater than the width of the car and disposed one above the other transversely in front of the car. These rods are connected together by vertical rods 13, 13, and one of the rods, for instance, the rod 11, is provided with means attached to some portion of the car, for supporting the fender or trip; as shown, two sockets 14, each substantially tubular in form and each secured to its corresponding front spring of the car. The socket may be secured to the car or vehicle in any suitable manner, but, as shown, the transverse bolt 15 of the spring 16, extends through the socket 14 adjacent the front end thereof, and the rear end of the socket is held by a brace 17, which is attached to one of the leaves of the spring. The middle rod or bar 11 of the fender is provided with T couplings 18, from each of which a plunger rod 19 extends rearwardly into its corresponding socket. The plunger rod is mounted to move lengthwise within the socket and is normally resiliently held in its forward limiting position, so that in case any obstacle comes in contact with the fender or trip, it may force the latter rearwardly. Any suitable means may be employed for connecting the socket or bracket member 14 and the rod member 19, so that the two may have a telescoping action. As shown, the rod 19 is provided with a transverse slot 20, through which the bolt 15 extends, so that this bolt serves not only to support the member 14, but also limits the longitudinal movement of the member 19. Within the member 14 is a coil spring 21, normally tending to force the member 19 forwardly. It is important that the fender be so mounted that it may move a limited distance in the event of a collision, but the specific means which I have illustrated for mounting it, is not at all necessary and I do not wish to be limited thereto.

The license number is carried by a tag or plate 22 in the ordinary manner, but this tag instead of being strapped or otherwise fastened directly to the car, is connected in any suitable manner to a rod 23. This rod has its ends pointed so as to fit within recesses or sockets 24 in the depending ends of levers 25. Two of these levers 25 are employed, and they are so mounted that their socket bearing ends may be spread apart so as to release the rod 23 and the tag carried by the latter. These levers may be pivoted to any suitable part of the car, but in order to make the device as compact and self-contained as possible, I construct the levers as bell crank levers and pivot them to the lower transverse member 12 of the fender or trip, so that the tag will hang suspended below said fender or trip. Suitable mechanism is connected to these levers, so that they will be operated when the fender is moved relatively to the car. This mechanism as illustrated, includes bell crank levers 26, pivoted to the T couplings 18 and connected to the bell crank levers 25 and to the socket members 14 by links 27 and 28, respectively. As the levers 26 move rearwardly with the fender and the rear ends of the links 28 are secured to the sockets or bracket members 14, it is evident that the rearward movement of the fender will cause the bell crank levers 26 to rock and cause the links 27 to pull upwardly and swing the levers 25. This will spread the lower ends of the levers 25 apart and release the rod 23 and the tag 22 carried thereby. By mounting the rod in this manner, both of the levers 25 may be operated simultaneously in case the entire fender is forced back, or either one of the levers 25 may be operated to release the tag should its corresponding end of the fender or trip be forced rearwardly in a collision.

Any collision in which the car may be involved, will release the number and drop it to the ground, so that other persons than the occupants of the car may secure possession of the number tag for purposes of later identifying the car, should the chauffer refuse to stop after the accident. In case the occupants of the car do wish to secure their number tag, it is necessary that they should stop the car, and this stopping of the car permits the detention of the occupants should they be responsible for the accident. After the occupant of the car secures possession of his number tag, he cannot easily return it to operative position between the levers 25, without the aid of a second party, as it will ordinarily be necessary for one person to force the fender or trip rearwardly, while a second person places the end of the rod in proper position between the levers 25.

Preferably the T couplings 18 are made adjustable lengthwise of the rod 11, so that they may be connected to vehicles having different distances between the springs or points of attachment. If desired, the telescoping bracket sections may be provided with locking means to hold them in such position that the tag cannot be replaced without releasing these fasteners. In Fig. 3, I have shown a spring-pressed catch 29, normally pressing against the inner surface of the member and adapted to pass out through an opening 30 when the parts are telescoped against the action of the spring.

My improved device serves not only to leave evidence behind as to the identity of a car, but a police officer seeing a car going along the street without its tag, may intercept the car and the occupant may be liable to arrest for driving a car without a license tag.

Having thus described my invention, I claim as new and desire to secure by Letters Patent:

1. In combination, an automobile license number tag, a trip, means for supporting said tag from said trip, and means whereby a movement of the trip releases the tag.

2. An attachment for motor vehicles, comprising a rod, two bell crank levers having sockets for receiving the ends of said rod, an identification tag carried by said rod, and a trip connected to said levers for moving them to inoperative position and dropping said rod and tag.

3. In combination with a vehicle, an identification device, arms for retaining said device in position upon the vehicle, yielding means for holding said arms in their operative position, and means adapted to be struck by an object in the path of a vehicle for causing said arms to assume their inoperative position whereby the device will be released.

4. In combination with a vehicle, means for engaging an identification device, an identification device adapted to be held in position on the vehicle by said means, said device being adapted to fall by gravity from its position when said means are removed from engagement therewith, and means adapted to be struck by an object in the path of the vehicle for moving said first-mentioned means out of engagement with said device.

5. In combination with a vehicle, a fender yieldingly mounted on the vehicle, oppositely arranged members mounted on the fender to move toward and from each other, an identification tag having means engaged by said members for holding the same, and means for operating the said members to move them apart and thereby release the tag when said fender moves rearwardly upon encountering an object.

6. In combination with a vehicle, a fender yieldingly mounted on the vehicle, oppositely arranged pivoted levers mounted on the fender to swing toward and from each other, an identification tag having means engaged by the said levers for holding the same, and means for operating said levers to swing them apart to release the tag when the fender moves rearwardly upon encountering an object.

7. In combination with a vehicle, a support carried by the vehicle, a fender yieldingly mounted on the support, a pair of bell crank levers pivoted on the fender, an identification tag having means engaged by the said levers for holding the tag, a second pair of bell crank levers mounted on the fender, links connecting the pairs of bell crank levers with each other, and a link connecting each bell crank lever of the second pair of bell crank levers with the support.

8. In combination with a vehicle, sockets carried by the vehicle, a fender having members slidably mounted in the sockets, springs in the sockets, a pair of bell crank levers pivoted on the fender and having sockets in their opposed faces, a rod for carrying an identification tag engaging the sockets of said bell crank levers, a second pair of bell crank levers on the fender, links connecting the pairs of bell crank levers, and a link connecting each bell crank lever of the second pair of bell crank levers with the first named socket.

9. In combination with a vehicle, a fender yieldingly mounted on the vehicle, oppositely arranged members mounted on the fender one adapted to move toward and from the other, an identification tag having means engaged by said members for holding the same, and means to separate said members and thereby release the tag when said fender moves rearwardly upon encountering an object.

In testimony whereof I have signed my name to this specification in the presence of two subscribing witnesses.

GEORGE H. HEWITT, Jr.

Witnesses:
C. W. FAIRBANK,
PHILIP D. ROLLHAUS.